E. HOLTON.
AUTOMOBILE HOOD CLIP.
APPLICATION FILED JULY 10, 1918.

1,310,286.

Patented July 15, 1919.

Edward Holton Inventor.

UNITED STATES PATENT OFFICE.

EDWARD HOLTON, OF CALGARY, ALBERTA, CANADA.

AUTOMOBILE-HOOD CLIP.

1,310,286.

Specification of Letters Patent.

Patented July 15, 1919.

Application filed July 10, 1918. Serial No. 244,316.

*To all whom it may concern:*

Be it known that I, EDWARD HOLTON, of the city of Calgary, in the Province of Alberta, Dominion of Canada, mechanic, have invented certain new and useful Improvements in Automobile-Hood Clips, and do hereby declare that the following is a full, clear, and exact description of same.

My invention relates to an improved hood clip for holding down engine hoods on automobiles. The device is to take the place of a wing nut, which is much used on automobiles, thereby converting the screw down hood clip into a spring hood clip. There is no change nor alteration other than taking the wing nut off the hinged bolt and replacing the present hood clip, spring and nut.

Figure 1:
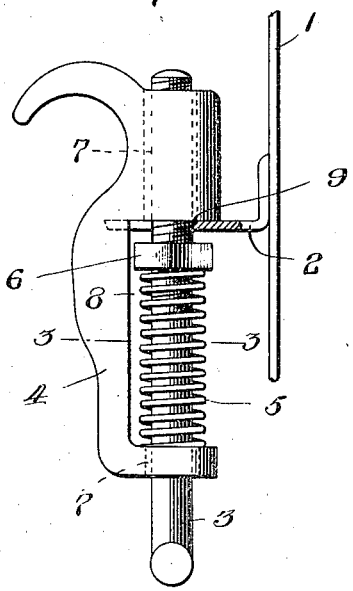
Figure 1 is a side elevation of the clip and bracket showing its association with the automobile hood, and the bolt and bracket previously used for holding said hood in lowered position.
Figure 2:
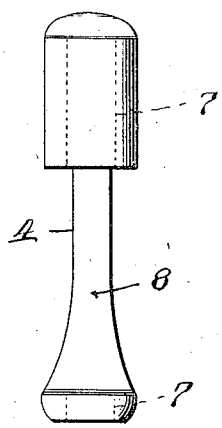
Fig. 2 is an inner edge view of the clip.
Figure 3:
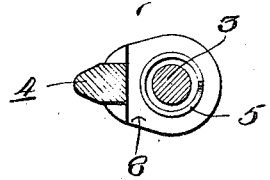
Fig. 3 is a horizontal section on the plane indicated by the line 3—3 of Fig. 1.

The drawing shows the spring clip as it is on the hood of the automobile. The hood 1, the bracket 2 and hinged bolt 3 are parts of the automobile. The clip 4, spring 5 and nut 6 comprise the improved spring clip. The clip 4 has a clearance hole 7 drilled vertically therethrough to receive the hinged bolt 3. The spring 5 and nut 6 are put over the hinged bolt as shown, and the nut is screwed down until it compresses the spring between the bottom wall of the gap 8 in the clip and the nut, when the clip is on the bracket. The bracket 2 is provided with the usual notch 9 which allows the hinged bolt, also part of the clip, to go in along the head of the clip to hold down on the bracket of the hood. The bolt 3 is hinged to the frame of the automobile, thereby holding the hood down to the frame by the tension of the spring 5, which can be adjusted by the nut 6. As there are several spring clips, which can be put on any hood with alterations, I do not claim the invention of the spring clip.

What I do claim as my invention and desire to secure Letters Patent for is:

A substitute for the wing nuts of hinged, automobile clip bolts, comprising a clip having a gap between its upper and lower ends, and a vertical bore opening into both ends of the gap to receive the bolt, a coiled spring in said gap adapted to surround the bolt, and a nut adapted for threading on the bolt to compress said spring against the bottom wall of the gap.

Dated at the city of Calgary, in the Province of Alberta, Canada, this 4th day of March, 1918.

EDWARD HOLTON.

Signed in the presence of—

A. M. DE LONG.